United States Patent
Ruutu et al.

(10) Patent No.: US 7,194,272 B2
(45) Date of Patent: *Mar. 20, 2007

(54) CALCULATION METHOD IN A RADIO SYSTEM FOR CALCULATING THE GEOMETRICAL TIME DIFFERENCE BETWEEN TRANSMITTERS

(75) Inventors: Ville Ruutu, Espoo (FI); Timo M. Rantalainen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 543 days.

This patent is subject to a terminal disclaimer.

(21) Appl. No.: 10/195,079

(22) Filed: Jul. 15, 2002

(65) Prior Publication Data

US 2002/0177452 A1    Nov. 28, 2002

Related U.S. Application Data

(63) Continuation of application No. 09/673,364, filed as application No. PCT/FI99/00291 on Apr. 7, 1999, now Pat. No. 6,445,928.

(30) Foreign Application Priority Data

Apr. 8, 1998    (FI) .................................. 980807

(51) Int. Cl.
    *H04Q 7/20*    (2006.01)
(52) U.S. Cl. ................ 455/456.1; 455/67.11; 455/703; 455/502
(58) Field of Classification Search ............ 455/456.1, 455/456.5, 456.3, 456.6, 457, 67.16, 502, 455/422.1, 440, 67.11, 67.14, 524, 69, 703, 455/500; 342/389, 450, 457
See application file for complete search history.

(56) References Cited

U.S. PATENT DOCUMENTS 4,268,830 A    5/1981    Brodeur
5,293,645 A    3/1994    Sood (Continued)

FOREIGN PATENT DOCUMENTS

FI    980 724    10/1999

(Continued)

OTHER PUBLICATIONS

Kreyszig, Chapter 22, "Graphs and Combinatorial Optimization," Advanced Engineering Mathematics, John Wiley & Sons, pp. 1112-1119, 1133-1146, (1993).

*Primary Examiner*—Lana Le
*Assistant Examiner*—John J. Lee
(74) *Attorney, Agent, or Firm*—Pillsbury Winthrop Shaw Pittman LLP

(57) ABSTRACT

A calculating method and a radio system comprising a set of emitters and a set of receivers and a measuring mechanism, which measure the time difference between the reception moments of signals transmitted by the transmitters while the receiver is receiving signals, and which calculate the geometrical time difference of the signals transmitted by the transmitters. The radio system includes a calculating mechanism, which forms the real time difference between the transmission moments of the signals transmitted by the transmitters as a function of time by of measuring the time difference of the signals transmitted by the transmitters as a function of time by of measuring the time difference of the signals received by the receiver and by of the geometrical time difference.

24 Claims, 3 Drawing Sheets

U.S. PATENT DOCUMENTS

| | | |
|---|---|---|
| 5,600,706 A | 2/1997 | Dunn et al. |
| 5,711,003 A | 1/1998 | Dupuy et al. |
| 6,021,330 A | 2/2000 | Vannucci |
| 6,108,558 A | 8/2000 | Vanderspool, II et al. |
| 6,181,944 B1 | 1/2001 | Uebayashi |
| 6,275,705 B1 | 8/2001 | Drane |
| 6,356,763 B1 | 3/2002 | Kangas et al. |

FOREIGN PATENT DOCUMENTS

| | | |
|---|---|---|
| WO | WO 89/04002 | 5/1989 |
| WO | WO 96/35306 | 11/1996 |
| WO | WO 98/52376 A1 | 11/1998 |
| WO | WO 99/55018 | 10/1999 |

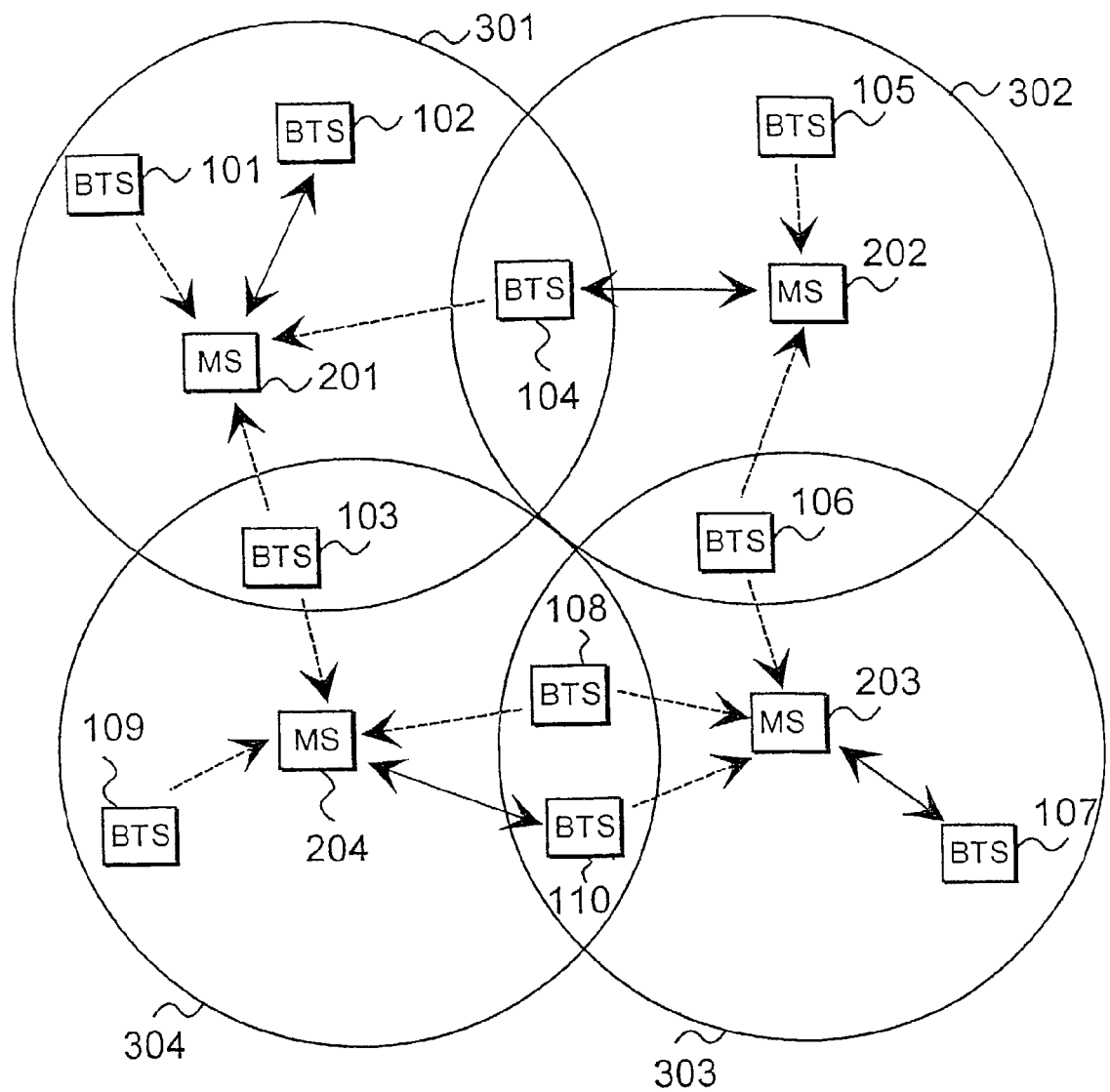
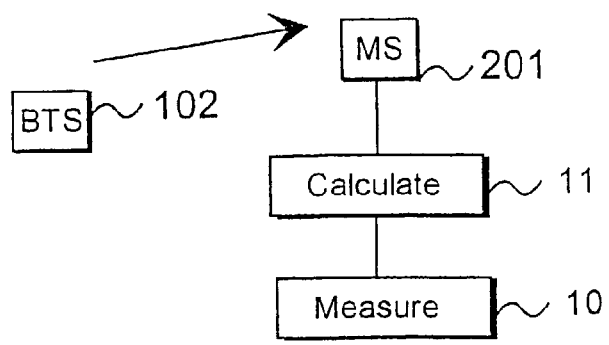
Fig. 1
Fig. 2

Fig. 4

| serving BTS \ neighbour BTS | 101 | 102 | 103 | 104 | 105 | 106 | 107 | 108 | 109 | 110 |
|---|---|---|---|---|---|---|---|---|---|---|
| 101 | 0 | -102,101 | | | | | | | | |
| 102 | 102,101 | 0 | 102,103 | 102,104 | | | | | | |
| 103 | | | 0 | | | | | | | |
| 104 | | | | 0 | 104,105 | 104,106 | | | | |
| 105 | | | | | 0 | | | | | |
| 106 | | | | | | 0 | -107,106 | | | |
| 107 | | | | | | 107,106 | 0 | 107,108 | | -107,110 |
| 108 | | | | | | | | 0 | | -110,108 |
| 109 | | | | | | | | | 0 | -110,109 |
| 110 | | | 110,103 | | | | | 110,108 | 110,109 | 0 |

Fig. 5

| | 101 | 102 | 103 | 104 | 105 | 106 | 107 | 108 | 109 | 110 |
|---|---|---|---|---|---|---|---|---|---|---|
| path length | 0 | 1 | 2 | 2 | 3 | 3 | 4 | 4 | 4 | 3 |
| RTD | 0 | 101,102 | 101,103 | 101,104 | 101,105 | 101,106 | 101,107 | 101,108 | 101,109 | 101,110 |

CALCULATION METHOD IN A RADIO SYSTEM FOR CALCULATING THE GEOMETRICAL TIME DIFFERENCE BETWEEN TRANSMITTERS

This is a Continuation of 09/673,364, filed Dec. 5, 2000 now U.S. Pat. No. 6,445,928, which is the National Stage of PCT/FI99/00291, filed on Apr. 7, 1999, the contents of both are hereby incorporated in their entirety by reference.

FIELD OF THE INVENTION

The invention relates to a calculation method to be used in a radio system comprising a set of transmitters and a set of receivers, in which radio system the time difference between the reception moments of the signals transmitted by transmitters is measured, and the geometrical time difference of the transmitted signals is calculated.

BACKGROUND OF THE INVENTION

In known radio systems, the reception moment of a signal arriving from a transmitter at a receiver helps to determine the location of a subscriber terminal in a radio system. In a prior art method, reception moments of signals transmitted by transmitters, e.g. base stations, are measured with respect to each other. This measured time difference of the signals is also called an Observed Time Difference (OTD).

Generally, transmitters are synchronised in such a way that lower levels of a radio system are synchronised by a synchronising signal coming from an upper level of the radio system. If base stations transmit a signal synchronously, the observed time difference is obtained solely by examining the distances of the base stations. The observed time difference of two synchronously functioning transmitters can thus be calculated by means of a so-called Geometrical Time Difference (GTD). If the locations of the transmitters are fixed and known in advance, the actual location of the subscriber terminal in the radio system can easily be calculated by means of propagation times of the signals. In practice, however, base stations functioning as transmitters do not totally synchronise with each other, and so errors occur when determining locations of subscriber terminals.

In known radio systems, the Real Time Difference of a radio transmitter, i.e. the time difference between transmission times of two transmitters, can be determined by the GTD calculated on the basis of the locations of transmitters and receivers, and by the OTD measured by receivers. The geometrical time difference between two signals is determined by means of the difference in the distance travelled by both signals, and by means of the propagation velocity of the signal. In known radio systems, locating a subscriber terminal is based on the signals transmitted by transmitters and received by receivers. On the basis of signals received by a receiver, information is obtained on the mutual synchronisation of the transmitters. Practically, the known radio systems comprise various receivers, and it is thus complicated to process time difference information based on the signals received by the receivers in such a way that the real time difference and the synchronisation between the various transmitters could easily be detected.

BRIEF DESCRIPTION OF THE INVENTION

It is thus an object of the present invention to provide a method and an apparatus implementing the method, in such a way that the above problems can be eliminated. This is achieved by a type of method disclosed in the introduction, which is characterized by forming the real time difference between the transmission moments of signals transmitted by a transmitter serving a respective receiver and by the neighbour transmitter of said transmitter as a function of time by means of measuring the time difference between the reception moments of the signals, and by means of the geometrical time difference, in such a way that the geometrical time difference is added to the time difference based on the reception moments, summing up directly measured real time differences in order to calculate the real time differences between the other transmitters in the coverage area of the receiver, calculating the real time differences between the transmitters in coverage areas of various receivers are calculated by making use of the time differences that already have been calculated between transmitters.

The invention also relates to a radio system comprising a set of transmitters, a set of receivers and a measuring means, which measure the time difference between the reception moments of signals transmitted by the transmitters while the receiver is receiving signals, and which calculate the geometrical time difference of the signals transmitted by the transmitters.

The radio system is characterized by comprising a calculating means, which form the real time difference between the transmission moments of signals transmitted by transmitters as a function of time by means of measuring the time difference of signals received by a receiver, and by means of the geometrical time difference, in such a way that the calculating means add the geometrical time difference to the time difference based on the reception moments, the calculating means sum up directly measured real time differences and thereby calculate the real time differences between the other transmitters in the coverage area of the receiver, and the calculating means calculate the real time differences of the transmitters in the coverage areas of various receivers by making use of the time differences that already have been calculated between the transmitters.

The preferred embodiments of the invention are disclosed in the dependent claims.

The invention is based on measuring differences between transmission times of transmitters, on the basis of which the real time difference is determined also between transmitters which transmit a signal to various receivers.

The method and system of the invention provide a plurality of advantages. In the method of the invention, vectors are formed on the basis of time difference values, which can thus be combined easily. Further, the method utilises a calculating algorithm, which enables the quick determination of the time difference values between all the transmitters in the radio network. The method can easily be implemented e.g. by means of software. By means of the method the synchronisation differences between the transmitters can be determined.

BRIEF DESCRIPTION OF THE DRAWINGS

In the following the invention will be described in greater detail in connection with the preferred embodiments, with reference to the attached drawings, in which
FIG. 1 shows a radio system of the invention;
FIG. 2 shows a receiver used in the radio system;
FIG. 4 shows a table of time difference values in a matrix form;
FIG. 5 shows a table the values of which form vectors.

DETAILED DESCRIPTION OF THE INVENTION

Figure 3:
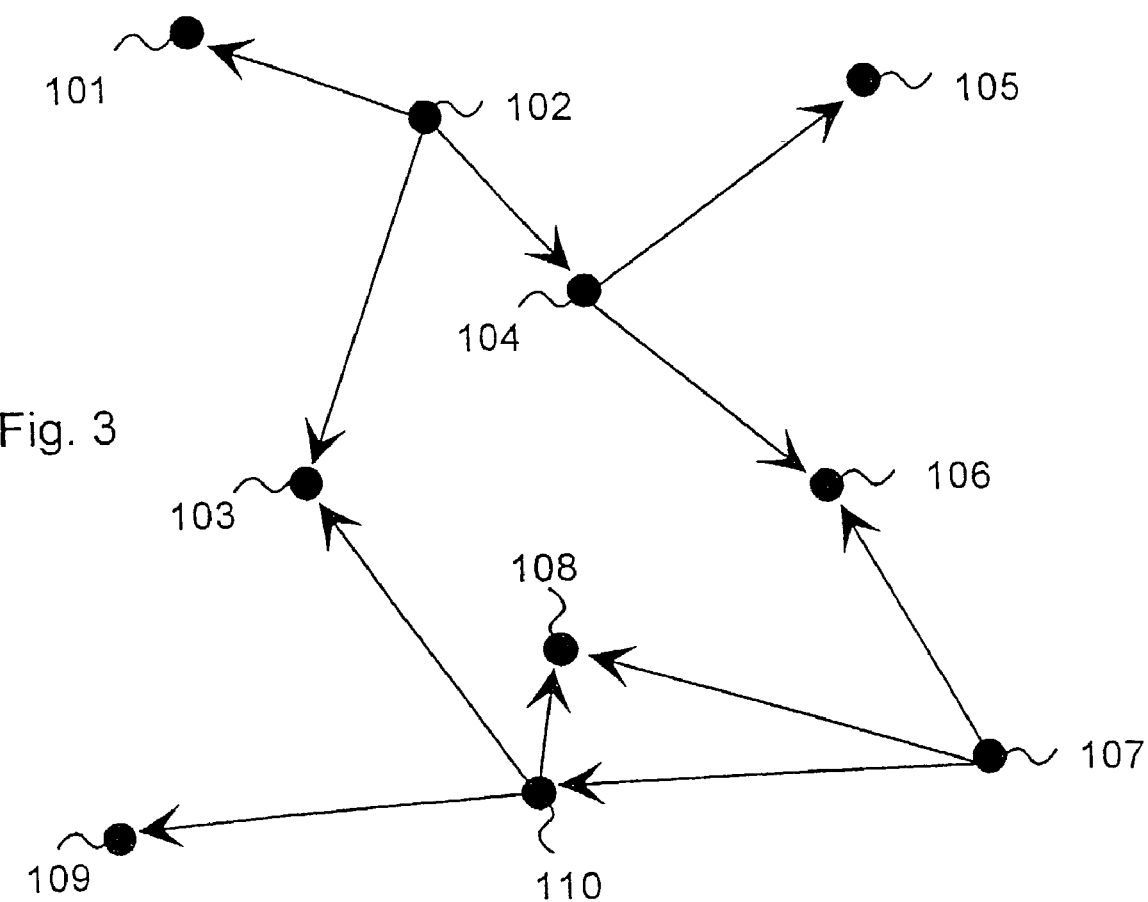
FIG. 3 shows a radio system.

FIG. 1 shows a radio system of the invention, comprising a set of transmitters 101–110, and a set of receivers 201–204. Receiver 201 of the radio system constitutes coverage area 301, receiver 202 constitutes coverage area 302, receiver 203 constitutes coverage area 303, and receiver 204 constitutes coverage area 304. Each receiver is capable of receiving a signal from its own coverage area. The figure shows that the coverage areas overlap somewhat. The receivers may be subscriber terminals, e.g. mobile phones. The receivers are placed preferably in places with known locations.

In the radio system, transmitter 104 is located in the overlapping part of coverage areas 301 and 302. Transmitter 103 is located in the overlapping part of coverage areas 301, 304. Transmitter 106 is located in the overlapping part of coverage areas 302, 303. Transmitters 108, 110 are located in the overlapping part of coverage areas 303, 304. In the radio system of the figure, each receiver shares at least one transmitter with another receiver.

In the radio system of the figure, a signal transmitted by a transmitter serving a receiver is illustrated by a continuous line. A broken line illustrates signals of neighbour transmitters of the transmitter serving the receiver. The transmitters of FIG. 1 can be e.g. base stations. Further, the receivers can be located in the base stations or e.g. in a separate locating centre.

FIG. 1 shows that receiver 201 is served by transmitter 102. Transmitters 101, 103, 104 located in the coverage area of receiver 201 are neighbour transmitters of transmitter 102. Transmitter 104 located in the overlapping part of the coverage areas of receivers 201, 202 serves receiver 202. Transmitters 105, 106 located in the coverage area of receiver 202 are neighbour transmitters of transmitter 104. Transmitter 107 located in the coverage area of receiver 203 serves receiver 203. Transmitters 106, 108, 110 located in coverage area 303 are neighbour transmitters of transmitter 107. Transmitter 110 located in the overlapping part of the coverage areas of receivers 203, 204 serves receiver 204. Transmitters 103, 108, 109 located in coverage area 304 are neighbour transmitters of transmitter 110 serving receiver 204. A receiver in the radio system shown in FIG. 1 is capable of contacting other receivers in the radio system as well, or a particular network element, whose function is to determine the real time differences between various transmitters.

The receivers of the radio system receive signals transmitted by the transmitter serving the receiver, and signals transmitted by the neighbour transmitters of the serving transmitter. FIG. 2 shows a receiver, comprising a measuring means 10, which measure the time difference between the reception moments of the signals transmitted by the transmitters. For example, if the signal transmitted by transmitter 101 shown in FIG. 1 is received in receiver 201 at the instant t1, and the signal transmitted by transmitter 102 arrives at the same receiver 201 at the instant t2, the OTD is t2−t1. The OTD can also be determined in such a way that the arrival time of the signal arriving from the neighbour cell is subtracted from the arrival time of the signal coming from the neighbour cell.

The measuring means 10 can calculate the geometrical time difference of the signals transmitted by the transmitter. The geometrical time difference can also be calculated in another network element, to which the receiver transmits its OTD measurement results, its identity or coordinates, as well as the identities or coordinates of the transmitters corresponding to the OTD measurement. The aforementioned network element can be e.g. an RTD computing centre. When calculating the geometrical time difference, the measuring means 10 make use of the lengths of transmission paths. Let us assume that the length of the transmission path between the transmitter 101 and the receiver 201 measures d1. Let us further assume that the length of the transmission path between the transmitter 102 and the receiver 201 measures d2. In the aforementioned situation, the following formula is used in calculating the geometrical time difference:

$$GTD=(d1-d2)/c,$$

wherein c indicates the propagation velocity of a signal.

The receiver of the radio system further comprises a calculating means 11, which form the real time difference, RTD, between the transmission moments of the transmitted signals. The calculating means 11 can also be located in a special RTD computing centre, in which the geometrical time difference has been determined and to which OTD measurement results have been transmitted. Assuming that the transmitter 101 transmits a signal at the instant t3, and the transmitter 102 transmits a signal at the instant t4, then the real time difference of the transmitters equals t3−t4. In practice, the real time difference is calculated by using the time difference measurement of the signals received by the receiver, and the geometrical time difference of the signals. The real time difference is calculated by the following formula:

$$RTD=OTD-GTD$$

If there are many transmitters in the area of the radio system, one receiver cannot measure all the transmitters in the radio system. This means that if there are many transmitters, there should also be more measuring receivers than before. As there has to be several receivers, the measurement results of various receivers have to be combined. Combining of the measurement results makes it possible to determine the real time difference of each transmitter compared to all the other transmitters. The calculating means 11 form the real time difference in such a way that the calculating means add the geometrical time difference to the time difference based on the reception moments. In practice, the adding is carried out e.g. in such a way that the geometrical time difference is subtracted from the measured time difference. The location of the receiver, which is needed for calculating the geometrical time difference, can be determined e.g. by means of the GPS method (Global Positioning System).

In addition, the calculating means 11 combine the real time difference values of the transmission moments of the transmitters. The calculating means 11 further determine the real time difference of the transmission moment of a transmitter compared to the transmission moments of the other transmitters. If the cellular radio system comprises a subscriber terminal with the measuring means 10 to measure OTD values, the corresponding RTD values can be combined with this information in order to determine GTD values. GTD values determine hyperbolas, which can be used to determine the location of the subscriber terminal.

The calculating means 11 determine the real time difference of the transmitter serving the receiver compared to the other transmitters in the coverage area of the receiver. Measuring the difference between the reception moments of the signals transmitted by the different transmitters (OTD) is not necessarily restricted only to measurements between the serving transmitter and the neighbour transmitter. For example, the OTD value of two neighbour transmitters can also be measured in the receiver. Further, the OTD value of two serving transmitters, which are e.g. in the CDMA system, can be measured in the receiver. In most cases, however, it is most advantageous to carry out the OTD measurement between the neighbour transmitter and the serving transmitter. The calculating means 11 further determine the real time difference between transmitters from which a direct OTD measurement is not carried out. If the transmitter is located in the coverage area of several receivers, a signal transmitted by the same transmitter is measured by the measuring means 10 located in the various receivers.

FIG. 3 shows a radio system, where RTD measurements are displayed by a graph. The vertices of the graph indicate transmitters, and the edges of the graph indicate the measured RTD values. As described above, the edges are thus e.g. real time differences (RTD) determined by means of measuring the difference between the reception moments of signals transmitted by the transmitters, and by means of the geometrical time difference (GTD). For example, the RTD measurement between the transmitters 101, 102 is indicated by the marking RTD(101, 102). In this example, the transmitter 102 is the transmitter serving the receiver, and the transmitter 101 is the neighbour transmitter of the transmitter 102. If the transmitter 102 transmits a signal before the transmitter 101, RTD(102,101) is bigger than zero. In the aforementioned situation, RTD(101,102) is smaller than zero. In the aforementioned situation RTD(101,102)=−RTD(102,101).

By summing up edges of graphs, the real transmission time differences between various transmitters can be determined. In such cases, the signs of the edges have to be taken into account, i.e. RTD(x,y)=−RTD(y,x). For example in FIG. 3, the real time difference between the transmitters 101,109 is detected by combining suitable RTD values with each other. In the following, the real transmission time difference between the transmitters 101,109 is calculated.

$$RTD(101,109)=-RTD(102,101)+RTD(2,3)-RTD(10,3)+RTD(10,9)$$

Assuming that the length or the weighting coefficient of each edge is one, the path length between the transmitters 101, 109 equals four. The transmission time difference between the transmitters 101, 109 can also be calculated along the following path, the length of which is six.

$$RTD(101,109)=-RTD(102,101)+RTD(2,4)+RTD(4,6)-RTD(7,6)+RTD(7,10)+RTD(10,9)$$

If there are several paths between two transmitters, the calculating means 11 select the shortest path as a basis for calculating time differences, because in this way the effects of potential inaccuracies in the measurements are diminished. If the paths between the transmitters are equally long, time differences are calculated on the basis of the mean value of the various paths, or e.g. on the basis of the first found path.

The calculating means 11 place the calculated real time differences between the transmission moments of the transmitters into a matrix, which facilitates the processing of the time differences. Thereafter, the calculating means 11 can also determine on the basis of the calculated time differences the real time difference of a transmitter, which has not been subjected to direct time difference measurements.

FIG. 4 shows a table in a matrix form, to which table the calculating means 11 place the real time differences between the transmission moments of the transmitters. In the figure, the matrix rows correspond to the transmitter serving the receiver. The matrix columns correspond to the neighbour transmitter of the serving transmitter. The calculating means 11 fill the diagonal of the matrix with zeros, because the real time difference of the transmitter compared to itself is always zero. Thereafter, the calculating means 11 always place the time difference values to the same side of the diagonal of the matrix. In the matrix of the figure, the time difference values are placed in the part of the matrix located above the diagonal.

The calculating means 11 are able to use a variety of search methods to determine time difference values of transmitters. The search methods utilise e.g. Moore's or Dijkstra's algorithm, by means of which it is possible to find the shortest paths between various transmitters, on the basis of which time differences between transmitters are determined. The aforementioned algorithms are explained in more detail e.g. in the publication Erwin Kreyszig: *Advanced Engineering Mathematics*, chapter 22, Graphs and Combinatorial Optimization, pages 1112–1119, John Wiley & Sons, 1993, which is incorporated herein by reference.

In the following, Moore's algorithm will be applied to the table shown in FIG. 4. The algorithm enables the definition of the shortest path e.g. from the transmitter 101 to all the other transmitters in the radio network. This begins with forming two vectors, the first vector including information on the path length from the transmitter 101 to the other transmitters in the radio network. The second vector includes the RTD values from the transmitter 101 to the other transmitters.

FIG. 5 shows a table, to which values provided by Moore's algorithm are placed, the values forming vectors. First, zeros are placed under the transmitter 101 in the table. Thereafter, all the directly measured RTD values are placed in the RTD row of the table in FIG. 5. The path length values corresponding to the said RTD values receive value one, because they are the directly measured values between transmitter the 101 and the other transmitters. FIG. 3 shows that the only direct measurement to be carried out from the transmitter 101 is to the transmitter 102. 1 is thus placed to the table shown in FIG. 5 as the path length under transmitter 102, and RTD(101,102)=−RTD(102,101) is given as the RTD value.

Next, the calculating means 11 go through all the neighbour transmitters of the transmitter 101, to which the path length equals one. In the example, only the transmitter 102 fulfils this condition. Moore's algorithm is applied to locate all the immediate neighbours of the transmitter 102 (nodal point), except the node 101, from which the process has arrived to the node 102. Immediate neighbours of the transmitter 102 are nodal points 103 and 104. The shortest path from the transmitter 101 to said nodal points is 2. Thus, 2 is marked as a path length to the vector under the transmitters 103 and 104. The corresponding RTD values are calculated by summing up RTD values as described above, i.e.

$$RTD(101,103)=-RTD(102,101)+RTD(102,103)$$

and $$RTD(101,104)=-RTD(102,101)+RTD(102,104).$$

Next, the most immediate neighbours of the transmitters 103 and 104, which have not yet been visited, are located and the same thing is done as before. The same procedure is repeated, until the RTD tables and the path length tables of FIG. 5 have been filled, and the real time differences of the transmitter 101 in respect of the other transmitters have been determined. The missing values can be placed into the empty spaces of the matrix in FIG. 4. Correspondingly, the real time differences of each transmitter in respect of the other transmitters are sought until all the necessary RTD values have been determined.

Although the invention has been described above with reference to the example according to the attached drawings, it is obvious that the invention is not restricted thereto, but may be modified in a variety of alternative ways within the scope of the inventive idea disclosed in the attached claims.

The invention claimed is:

1. A calculation method to be used in a radio system comprising a set of transmitters and a set of receivers, in which radio system the time difference between the reception of signals transmitted by the transmitters is measured, and the geometrical time difference of the transmitted signals is calculated, comprising:

forming the real time difference between the transmission moments of signals transmitted by a transmitter serving a respective receiver and by the neighbor transmitter of said transmitter as a function of time by means of measuring the time difference between the reception moments of the signals and by means of the geometrical time difference, in such a way that the geometrical time difference is added to the time difference based on the reception moments, summing up directly measured real time differences in order to calculate the real time differences between the other transmitters in the coverage area of the receiver, and calculating the real time differences between transmitters in coverage areas of various receivers by using the time differences that have already been calculated between the transmitters.

2. The method according to claim 1, wherein the real time difference between the transmission moments is formed by means of measuring the time difference between the reception moments of signals transmitted by two neighbor transmitters, and by means of the geometrical time difference.

3. The method according to claim 1, wherein the real time difference between the transmission moments is formed by means of measuring the time difference between the reception moments of signals transmitted by two serving transmitters, and by means of the geometrical time difference.

4. The method according to claim 1, wherein the difference of the reception moments of the signals transmitted by the transmitter serving the receiver and by the neighbor transmitter of said transmitter is used to determine the synchronization of the transmitters with each other.

5. The method according to claim 1, wherein the difference of the reception moments of the signals transmitted by two neighbor transmitters and/or two serving transmitters is used to determine the synchronization of the transmitters with each other.

6. The method according to claim 1, wherein a signal which has arrived at different receivers and which was transmitted by the same transmitter is measured, if the transmitter is located in the coverage area of several receivers.

7. The method according to claim 1, wherein the signals transmitted by the transmitters located in each of the coverage areas of the receivers is measured, and the real time differences calculated on the basis of the signals received from each coverage area is used in calculating the time differences between the transmitters in various coverage areas.

8. The method according to claim 1, wherein graphs are formed on the basis of the transmitters and the real time differences between them, in which graphs the transmitters are displayed as nodal points and the directly measured real time differences are displayed as lines, by seeking paths from a transmitter to the other transmitters and by summing up the real time differences between the transmitters in order to determine real time differences which have not been discovered before.

9. The method according to claim 8, wherein the time difference values of the shortest path for the summing up is selected, if several paths exist between the transmitters.

10. The method according to claim 1, wherein the real time difference is used in order to locate a subscriber terminal in a radio system when measuring the observed time differences between the arrival times of the signals coming from the transmitters.

11. A radio system comprising a set of transmitters, a set of receivers and a measuring means which measure the time difference between the reception moments of signals transmitted by the transmitters while the receiver is receiving signals, and which calculate the geometrical time difference of the signals transmitted by the transmitters, wherein the radio system comprises a calculating means, which form the real time difference between the transmission moments of signals transmitted by transmitters as a function of time by means of measuring the time difference of signals received by a receiver, and by means of the geometrical time difference, in such a way that the calculating means add the geometrical time difference to the time difference based on the reception moments, the calculating means sum up directly measured real time differences and thereby calculate the real time differences between the other transmitters in the coverage area of the receiver, and the calculating means calculate the real time differences of the transmitters in coverage areas of various receivers by using the time differences that have already been calculated between the transmitters.

12. The radio system according to claim 11, wherein the calculating means form the real time difference between the transmission moments by means of measuring the time difference between the reception moments of signals transmitted by two neighbor transmitters, and by means of the geometrical time difference.

13. The radio system according to claim 11, wherein the calculating means form the real time difference between the transmission moments by means of measuring the time difference between the reception moments of signals transmitted by two serving transmitters, and by means of the geometrical time difference.

14. The radio system according to claim 11, wherein the calculating means use the difference of the reception moments of signals transmitted by two neighbor transmitters and/or two serving transmitters to determine the synchronization of the transmitters with each other.

15. The radio system according to claim 11, wherein the calculating means use the difference of the reception moments of the signals transmitted by the transmitter serving the receiver and by the neighbor transmitter of said transmitter to determine the synchronization of the transmitters with each other.

16. The radio system according to claim 11, wherein various measuring means measure a signal of the same transmitter, if the transmitter is located in the coverage area of several receivers.

17. The radio system according to claim 11, wherein the calculating means determine the real time difference of the transmitter serving the receiver compared to the other transmitters in the coverage area of the receiver.

18. The radio system according to claim 11, wherein the calculating means form a matrix, where the rows correspond to the transmitter serving the receiver and the columns correspond to the neighbor transmitter of the serving transmitter, and the calculating means use the matrix in order to calculate the real time differences between the transmission moments of the transmitters.

19. The radio system according to claim 11, wherein the calculating means place the calculated real time differences between the transmission moments of the transmitters into a matrix, after which the calculating means determine the real time difference for the transmitter on the basis of the calculated time differences without the measuring means directly measuring the signal transmitted by the transmitter.

20. The radio system according to claim 11, wherein the calculating means form graphs on the basis of the transmitters and the real time differences between them, in which graphs the transmitters are displayed as nodal points and the directly measured real time differences are displayed as lines, after which the calculating means seek paths from transmitters to the other transmitters and the calculating means sum up real time differences between the transmitters in order to determine real time differences which have not been discovered before.

21. The radio system according to claim 20, wherein if several alternative paths exist between the transmitters, the calculating means select the shortest path, on the basis of which the time difference is determined.

22. The radio system according to claim 11, wherein in order to locate a receiver the real time difference is used, in such a way that the corresponding real time difference is subtracted from the time difference between the reception moments of the signals measured by the receiver to be located, e.g. a subscriber terminal.

23. The radio system according to claim 11, wherein the calculating means form a matrix, where the rows correspond to the transmitter, to which the time difference of another transmitter is compared, and where the columns represent the other transmitter, and where the calculating means use the matrix in calculating the real time differences between the transmission moments of the transmitters.

24. The radio system according to claim 11, weherein the receiver is a subscriber terminal, such as a mobile phone.

* * * * *